United States Patent [19]
Guigné et al.

[11] Patent Number: 5,500,493
[45] Date of Patent: Mar. 19, 1996

[54] ACOUSTIC BEAM LEVITATION

[75] Inventors: Jacques Y. Guigné, Paradise, Canada;
Martin B. Barmatz, LaCanada; Henry W. Jackson, Laverne, both of Calif.;
Sergei V. Koptenko, Paradise, Canada

[73] Assignee: Guigne International Ltd., Paradise, Canada

[21] Appl. No.: 333,514

[22] Filed: Nov. 2, 1994

[51] Int. Cl.⁶ .................................................. G10K 15/00
[52] U.S. Cl. .......................................... 181/0.5; 367/191
[58] Field of Search ................................ 181/0.5; 73/505, 73/570.5; 367/191, 138

[56] References Cited

U.S. PATENT DOCUMENTS

| | | | |
|---|---|---|---|
| 3,164,022 | 1/1965 | Ensley | 181/0.5 |
| 3,232,120 | 2/1966 | Ensley | 181/0.5 |
| 5,036,944 | 8/1991 | Danley et al. | 181/0.5 |
| 5,257,676 | 11/1993 | Merkley et al. | 181/0.5 |

*Primary Examiner*—Daniel T. Pihulic
*Attorney, Agent, or Firm*—Freilich Hornbaker Rosen

[57] ABSTRACT

A system is described that uses acoustic energy to position an object, which simplifies the application of forces in defined directions to the object and which enables the application of large forces to the object. The system includes transducers (21–24, FIG. 1) that direct separate acoustic beams (31–34) at the object (12), with the system constructed so the beams do not create standing wave patterns. A plurality of beams whose phases at the object are not closely controlled, are directed at different surface areas of the object so the beams do not substantially overlap at the object and create possible canceling effects. A very large force is applied to the bottom (124 FIG. 8) of an object lying in a gravity environment, by directing a plurality of beams (141–145) at the same area at the bottom of the object, and with the beams being controlled so they are substantially in phase at the object area. This plurality of beams can also replace one or all of the transducers (21–24, FIG. 1) to provide much stronger forces to position and manipulate the object. The wavelength (B, FIG. 2) of the acoustic energy in each beam is preferably much less than one-tenth the diameter (C) of the object in order to obtain efficient momentum transfer of energy to the object.

17 Claims, 3 Drawing Sheets

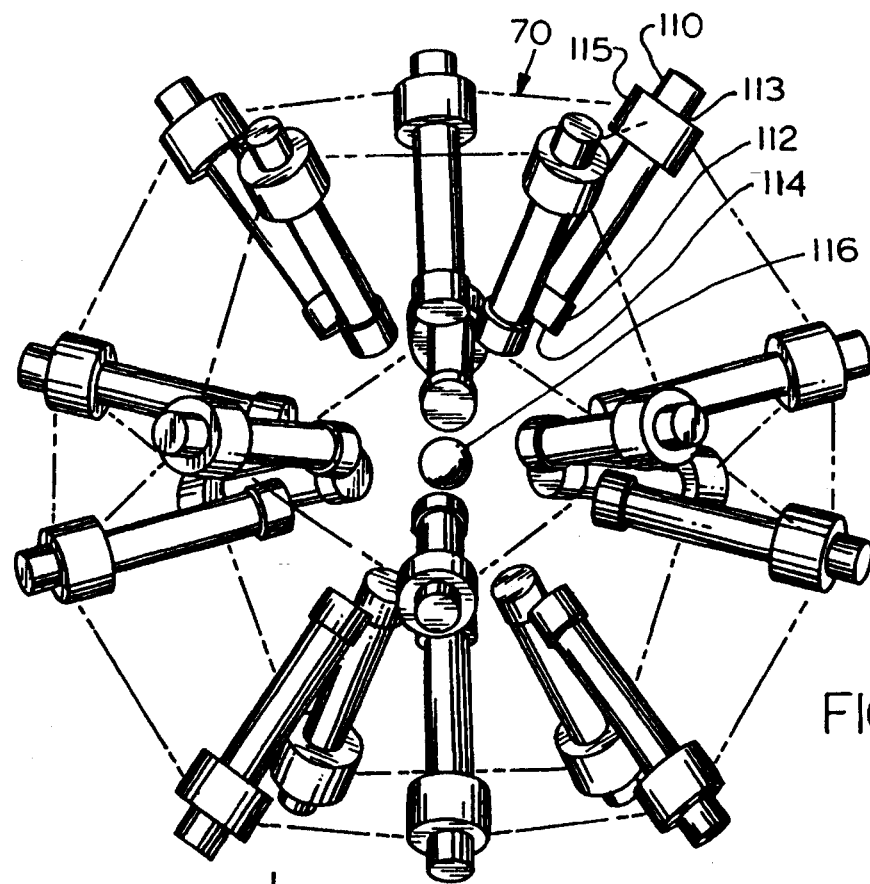
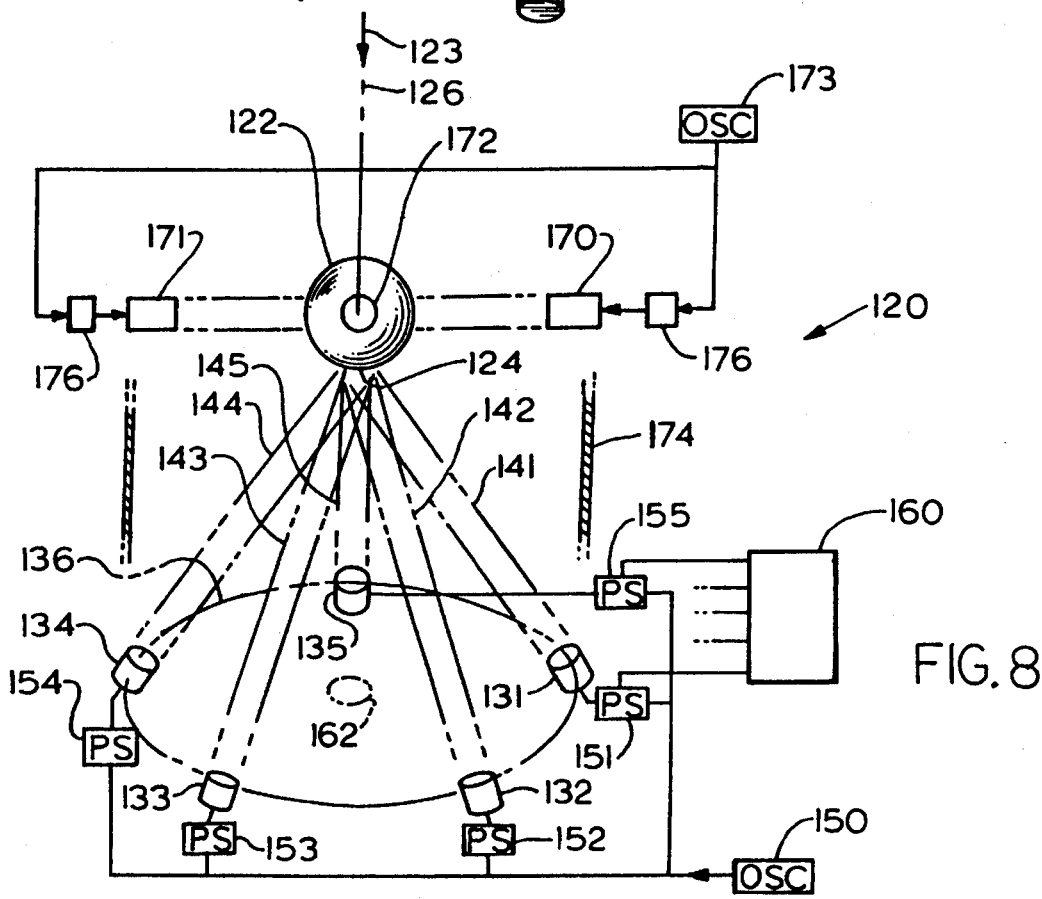
FIG. 7
FIG. 8

ACOUSTIC BEAM LEVITATION

BACKGROUND OF THE INVENTION

This invention relates to apparatus and methods for suspending, positioning, and manipulating objects by the use of acoustic energy.

Acoustic levitation of an object within a chamber has heretofore been accomplished by the use of one or a few acoustic standing wave patterns, wherein the acoustic wavelength was between about one-quarter and twice the length of the chamber. The chamber had to have highly sound reflective walls to provide a Q (a measure of sound reflectance) of at least about fifty. The object remained at a region of low acoustic pressure, because as it drifted in a particular direction, radiation pressure of the standing wave pattern pushed the object back. While harmonics of a fundamental or lowest frequency could be used, these higher harmonics restricted the size of the object. For these acoustic levitators, the object size had to be small compared to the acoustic wavelength, such as no more than about 20% of the wavelength. U.S. Pat. No. 4,573,356 describes the general state of the art of the use of acoustic standing wave patterns to levitate objects.

The prior art use of acoustic standing wave patterns, involved the use of one or only a few transducers which all emitted sound of relatively long wavelengths within a high Q chamber. A large sample requires a very long wavelength and long chamber. It is difficult to produce high intensity sound of long wavelengths and corresponding low frequencies. The force that could be applied to a levitated object was limited by the small number of transducers that could be easily used. Movement and shaping of the object required complicated control or required alteration of the chamber dimensions. A system for acoustically levitating an object, which enabled the effective application of acoustic energy from a large number of transducers, which avoided the need for a chamber of high Q, and which enabled simplified control of the position, shape, etc. of large objects with respect to the sound wavelength, would be of value.

SUMMARY OF THE INVENTION

In accordance with one embodiment of the present invention, an acoustic levitation apparatus and method are provided which enable the application of large acoustic forces to a levitated object and the relatively simple control of object position, shape, and other characteristics. The apparatus includes a plurality of transducers lying around an object levitation position where an object can lie. The transducers are constructed to direct separate and non-standing wave acoustic beams at the object along specified directions. Beams that are not closely controlled in phase, are directed at different locations on the object. There is minimal beam overlap that could cause wave cancellation associated with overlapping beams that are about 180° out of phase. The beams have a short wavelength with respect to the object width to permit the use of geometric acoustics (wherein sound behaves somewhat like light), as to limit beam diameter to avoid beam overlap. This results in a large momentum transfer from the beam to a localized region of the object to apply force to it. The chamber or other region within which the object lies, has a low overall acoustic reflectance or Q, to avoid the generation of standing wave patterns that could produce unpredictable forces on the object.

In an Earth gravity environment, a large force can be applied to the bottom of the object by a group of transducers that generate beams that overlap at a bottom area of the object. The beams are controlled so they are in phase at the bottom of the object. Elsewhere, the remaining beams do not overlap and it is not necessary to control their phases.

The novel features of the invention are set forth with particularity in the appended claims. The invention will be best understood from the following description when read in conjunction with the accompanying drawings.

BRIEF DESCRIPTION OF THE DRAWINGS

FIGS. 3–5 and 1A are isometric views of "Platonic Solids" or "Regular Convex Polyhedrons" at whose vertices applicant can place transducers for maximum separation of beams, wherein FIG. 3 represents a cube which has eight vertices, FIG. 4 represents an icosahedron which has twelve vertices, FIG. 5 represents a dodecahedron which has twenty vertices, and FIG. 1A is an octahedron.

FIG. 7 is an isometric view of the transducer arrangement with the transducers arranged at the vertices of the dodecahedron of FIG. 6.

FIG. 8 is a partial isometric and schematic diagram of an acoustic levitation system that is especially useful to support an object in Earth's gravity.

DESCRIPTION OF THE PREFERRED EMBODIMENTS

Figure 1:
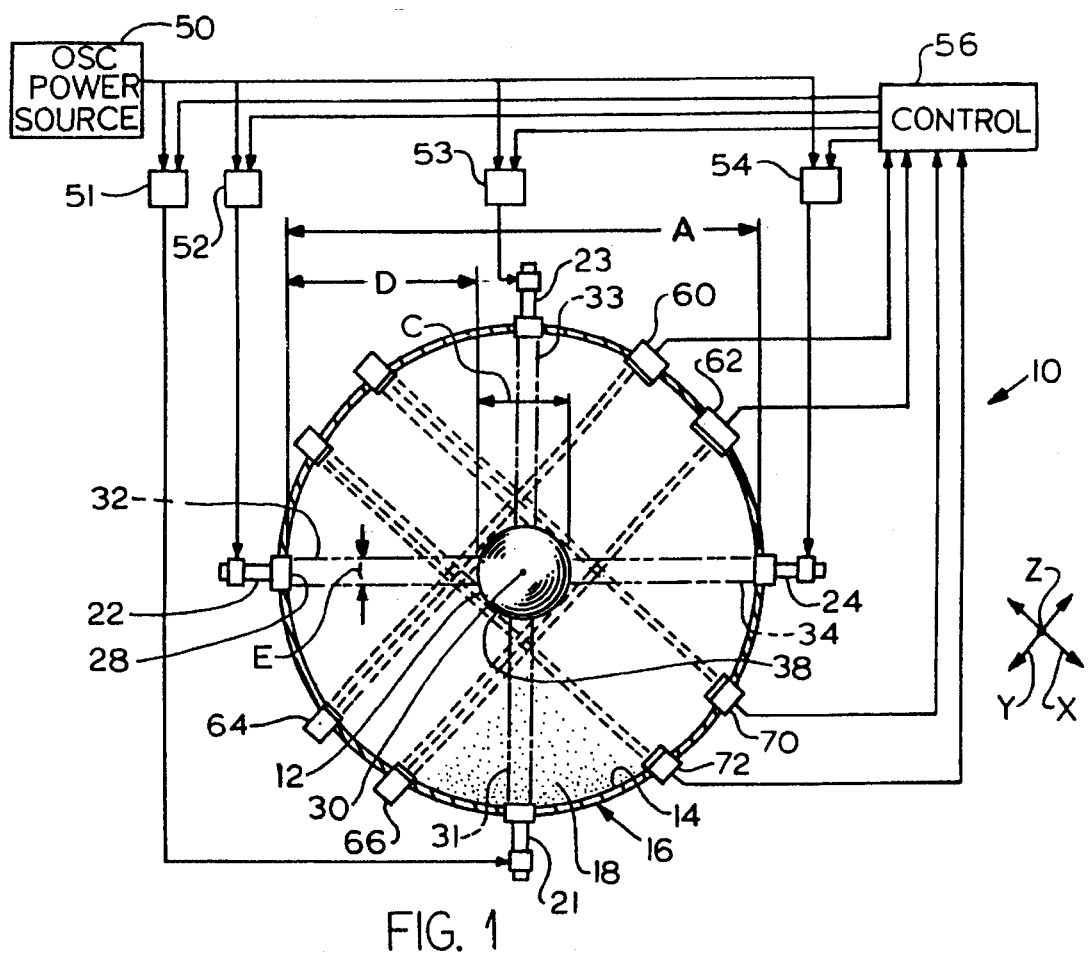
FIG. 1 is a sectional view and schematic diagram of an acoustic levitation apparatus or system constructed in accordance with one embodiment of the present invention.

FIG. 1 illustrates an acoustic levitation apparatus or system 10 which levitates an object 12. Applicant uses the term "levitation" to mean the positioning of an object away from a solid support, whether in Earth's gravity or in the microgravity of outer space. The object lies within a chamber 14 formed by walls of a container 16 that is filled with gas 18. A group of six transducer units, each composed of one or more transducers energized in synchronism, are provided that are positioned at the vertices of an imaginary regular convex octahedron (shown as 20 in FIG. 1A). FIG. 1 shows four of the transducers 21–24, and all transducers are evenly spaced apart. Each of the transducers has an emitting part or face 28 that faces the object 12, and especially faces towards a levitation or preferred center position 30 at which the object may be centered. The transducers produce six separate acoustic beams, with four of them 31–34 being shown in FIG. 1. The particular transducers are piezoelectric types whose output is the frequency of the applied current. It should be noted that transducers are available, such as sirens, whose output frequency does not equal the frequency of an energizing current.

Each of the transducers produces a non-standing wave acoustic beam 31–34. The beams are non-standing wave beams in that they do not produce a significant standing wave pattern. That is, any beam reflections from the object surface 38 are not significantly reflected back from the walls of the chamber or from transducer faces to the object so as to produce a standing wave pattern that produces a significant force (more than one-fifth or one-tenth of the total force) on the object. Also, even if a beam passed across the chamber to the opposite chamber wall, there would not be significant beam reflections from the chamber wall to produce a standing wave pattern. Instead, the momentum of moving air produced by each acoustic beam 31–34 is transferred to a limited area of the object to produce a force thereat. Acoustic energy reflected from the object is preferably absorbed by the walls of the chamber rather than having a large proportion of the object-reflected beams being reflected by the chamber walls. Any large rereflections of beam energy might be out of phase at a corresponding area of the object where the beam is first directed, and could cause cancellation as well as enhancement of the beam, in an uncontrolled manner, so that such reflections are generally unwanted in this system.

In the prior art, acoustic levitation of objects was accomplished by purposely establishing one or a few standing wave patterns. For a standing wave pattern between opposite flat surfaces spaced by a distance L the lowest resonant frequency was 2L. Harmonics with wavelengths such as L or one-half L could be used, but as the wavelength decreased it restricted the size of the object or sample to be levitated. This is because the sample dimensions had to be small compared to a wavelength, such as no more than about 20% of the wavelength, in order to apply sufficient forces to position the object. Also, if the gas within the chamber were heated and/or the opposite walls became warped or moved together or apart, or the object changed shape or position, the frequency had to be change accordingly to maintain a resonant condition. Also, the opposite walls of the chamber had to be highly sound reflective, which meant that only a minimum area could be taken up by heating elements, sensors, etc. Also, only a few transducers could be used without complicated circuitry to maintain them in a proper phase relationship. Although such standing wave patterns could position an object, any movement or shaping of the object require complicated controls.

Figure 2:
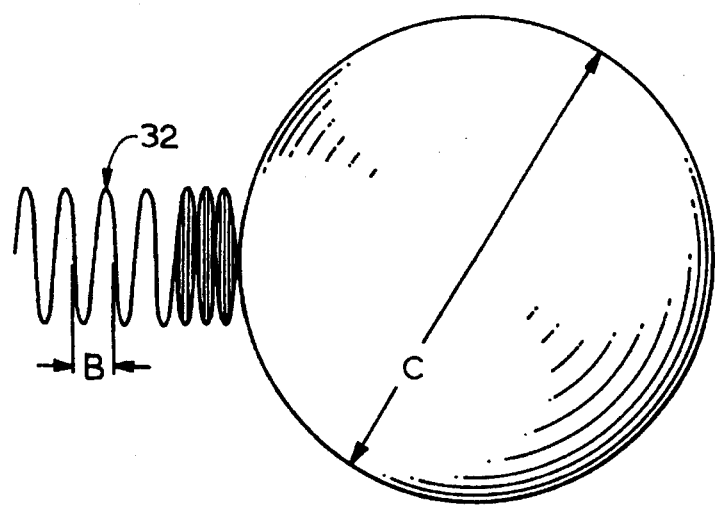
FIG. 2 is a view of the area around the object of the apparatus of FIG. 1, and indicating interaction of the acoustic energy with the object.

Applicants' beams do not generate standing wave patterns, generally avoid the need for highly resonant chambers, avoid the restriction that only a small number of transducers be used, and avoid a need for close control of transducer phases. Generally, the different acoustic beams in the present system are directed at specific areas of the object, with the beams generally not overlapping, to avoid the possibility that out of phase beam portions could cancel one another. The width of the beams is a maximum without causing overlapping. It would be possible to direct different beams at primarily overlapping object areas if the beams are not "on" at the same time. In FIG. 1, the chamber has a width A of 18 inches, and is shown levitating an object 12 having a diameter C of 3.5 inches. The face 28 of each transducer is spaced a distance D from the object's surface of 7¼ inches and each beam has a beam width E of one inch. Each transducer generates a beam such as 32 having a frequency of 70 kHz, resulting in a small wavelength B (FIG. 2). The velocity of sound in air at atmospheric pressure is about 1,100 feet per second, so that the wavelength B for 70 kHz is about 0.15 inch. If the pressure of gas in the chamber increases to ten atmospheres, the velocity may increase by about three times, resulting in a wavelength B of about 0.45 inch. The velocity changes only moderately for different inert gases such as nitrogen or argon. The gas in the chamber could include a noninert component to limit evaporation of that material from a heated object. It is possible to modulate the beam at a low frequency, but the primary energy of the beam would still be at its highest frequency such as 70 kHz.

The particular body 12 is of glass which has a density or specific gravity of about four. Since many glasses are oxides, they can be processed using air as the surrounding gas. In one application, components of the desired glass composition are pressed together into the shape of a ball and placed in the chamber. The ball is then heated (e.g. by lasers) until the glass is molten, while the molten body is acoustically levitated and oscillated to mix the components. After the glass hardens, it is drawn into a thin optical fiber of very great length. The acoustic positioning avoids impurities from a crucible that would cause loss of light along the long optical fiber.

The sonic beam such as 32 (FIG. 2) produces a force on the body by transfer of momentum of the moving air caused by the acoustic wave of the beam, against the body. In order to obtain an efficient transfer of momentum, the wavelength B of the sound should be much less than the diameter C of the body, with the momentum transfer being greatest where B is no more than about one-eighth C, and degrading rapidly as the wavelength B approaches one-half C. As a result, applicant prefers to use a high frequency sonic beam. Applicant would prefer a frequency of about 200 kHz or somewhat higher, but has found it difficult to obtain transducers with high outputs at frequencies above about 70 kHz. The higher frequencies are desirable to help shape the beam, so it will be narrow enough at the body to avoid overlapping any other beam (which could result in out-of-phase cancellation). In the case of the body 12 having a diameter C of 3.5 inches, a maximum wavelength B equal to one-eighth of C would, in air at atmospheric pressure, result from an acoustic beam having a frequency of 30 kHz.

Referring again to FIG. 1, it can be seen that applicant uses a power source 50 that comprises an oscillator whose output may be of a frequency such as 70 kHz. The output of the power source is delivered through a group of switches such as 51–54 which are operated by a control 56 which can open or close each of the switches. In an outer space environment, the object 12 could drift from the center position 30 in an uncontrolled way, as when an astronaut walks in one direction, causing the space craft to move in the opposite direction. The control 56 can briefly close selected switches such as 51–54 to briefly energize selected transducers such as 21–24 to maintain the object at a constant position. It can be understood that if the object drifts in a direction between beams, the restoring force may be weak, which indicates that a larger number of transducers are usually preferred.

One embodiment of this system leads to the positioning of an object that is passively stable, i.e. it requires no feedback or active control. Other embodiments use sensors to monitor the object and acoustic field to provide active feedback for enhanced object stability and manipulation.

FIG. 1 shows sensors 60, 62 which detect the width of light beams from light sources 64, 66 to detect movement of the object in a first direction X, with the outputs of the sensors delivered to the control 56. Another pair of sensors 70, 72 are used to detect movement of the object in a perpendicular direction Y. Another pair of sensors (not shown) are used to detect object movement in a third direction Z. The system includes additional acoustic sensors for detecting shape changes of a spherical liquid object, and apparatus such as a laser beam, microwave, or other heating assembly for heating the object, sensors for detecting temperature at various locations within the chamber, etc.

It is noted that there is a better impedance match between the acoustic waves in the gas at both the transducer face 28 and the surface of the object 12, when the density of the gas is increased. The gas density can be increased by increasing the pressure of gas within the chamber. The purpose of the chamber walls is to contain the pressurized inert gas, and not to reflect sound waves. In fact, damping material can be used on the inside of the chamber walls to avoid sound reflection. The overall Q of the chamber is much less than the preferred value of at least about 50 for a resonant chamber, and is preferably less than 10 to avoid substantial sound reflection. It is noted that the term Q not only indicates sound reflection, but defines the shape of the resonance curve. Thus, a frequency shift from resonance, where the shift equaled 1% of the resonant value, would be required to lower the sound pressure level by 6dB for a resonant chamber having a Q of 200.

Although the system of FIGS. 1 and 2 can levitate an object in a microgravity environment such as in outer space, it produces a limited force on the object due to the limited number of transducers. It might be thought that larger transducers could be used, but their efficiency decreases at higher frequencies, and such transducers are not readily available. Transducers having a face diameter of about one inch and which produce a large output at frequencies up to about 70 kHz are available. It is also possible to focus acoustic beams as by using a concave transducer face.

Figure 1A:
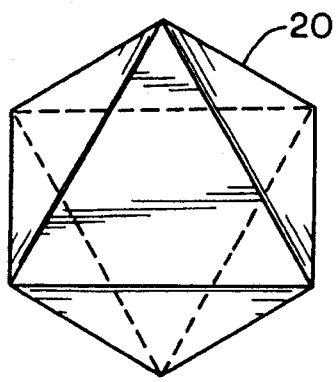
Figure 3:
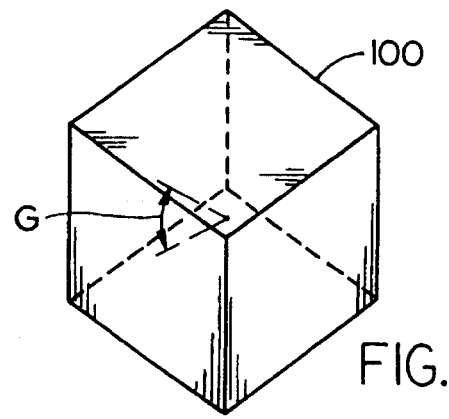
Figure 4:
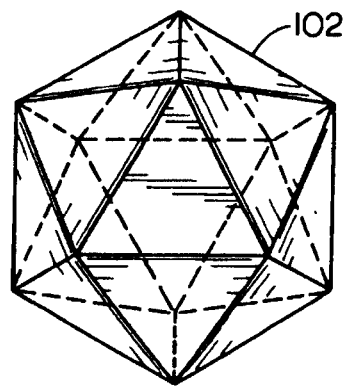
Figure 5:
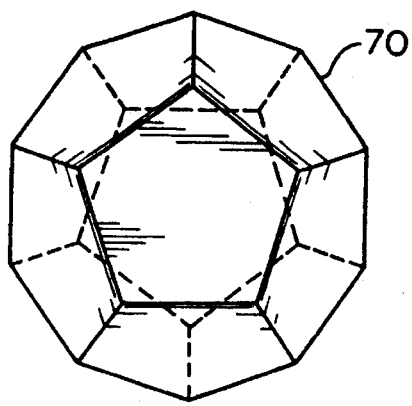
Figure 6:
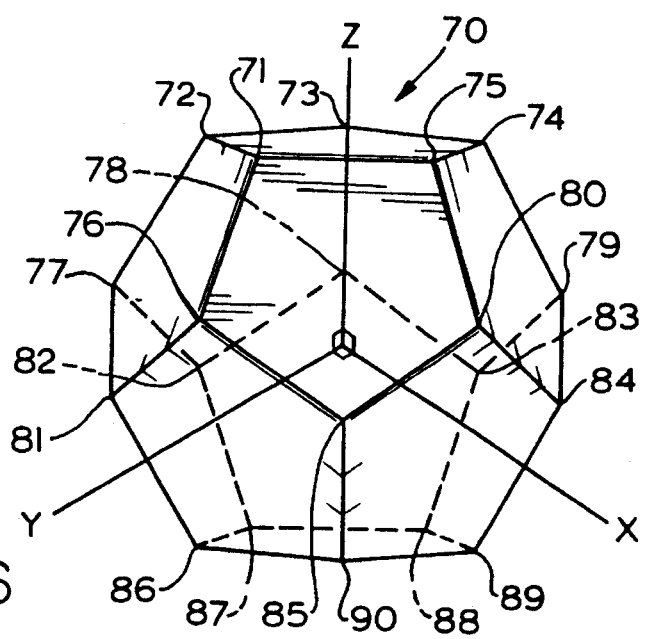
FIG. 6 is an isometric view of the dodecahedron of FIG. 5, but taken from a different angle.

Applicant prefers a system that can apply large forces, by applying many relatively narrow beams to the object. FIGS. 5 and 6 illustrate a regular geometric shape 70 which has twelve equal faces and twenty vertices that are equally angularly spaced apart from one another, and which is referred to as a dodecahedron. Applicant prefers to use a system containing 20 transducers each located at one of the vertices 71–90 of the dodecahedron. Twenty non-diverging beams that are each of one inch diameter will have substantially no overlap, for an object having a diameter of about 2.5 inches or more. For a somewhat smaller object, there will be minimum overlap and consequent possibility of cancellation over a limited area. There are only five "Platonic Solids" wherein transducers at the vertex of the body are equally spaced apart. One of these is a tetrahedron which has four triangular-shaped faces and four vertices, while another is an octahedron, which has eight faces and six vertices, and is represented in FIG. 1A. FIG. 3 shows a cube 100 which has eight vertices, with the angle G between vertices being 70°. FIG. 4 shows an icosahedron 102, which has twenty faces and twelve vertices, which also results in more transducers than in FIG. 1. Applicant's use of the vertices of the dodecahedron 70 of FIG. 5 or 6 provides the largest number of transducers which are equally spaced from each other.

"Equivalency" is where the angle in every direction with respect to a center point, between one transducer unit and each of its nearest neighbor transducer units, is the same for each transducer unit. Equivalency occurs only where each transducer unit is located at the vertex of one of the Platonic solids. It is desirable to place the transducer units so there is equivalency between them, to achieve stability of object position and symmetry of object shape for a fluid object, with minimal control.

FIG. 7 shows how the twenty transducers 110 are arranged, with their piezoelectric transducer parts 112 lying inside adjustable tubes 113, where the tubes lie at the vertices of the dodecahedron shape 70, and their emitting parts or faces 114 lying at the vertices of a geometrically similar but smaller dodecahedron and directed toward the center of an object 116. With the beams being nonoverlapping or only slightly overlapping (no more than 20% of the area of one beam overlaps another), the force provided by each beam is separate and known, and it is easier to provide controlled forces in desired directions to the object. As mentioned above, the forces are used not only to position the object, but to oscillate, rotate, and shape the object. The particular location of the chamber walls that are used to contain a gas, does not matter, so long as there is room to provide sensors, openings for a manipulator to insert and retrieve the object, and other necessary equipment. A sealed chamber or room is desirable even when air is used, to keep out dust.

In FIG. 7, nuts 115 can be adjusted to move the transducers toward and away from the central levitation position of object 116. If a larger object is to be levitated, the transducers may be moved out, to provide a larger distance between each transducer face and the adjacent object surface location. This assures that the distance between each transducer and the object will be at least 5 or 10 wavelengths long to avoid a significant standing wave pattern.

FIG. 8 illustrates a system 120 which is used to levitate an object 122, where the object is subjected to the Earth's gravity, or one G (indicated by downward arrow 123) instead of the microgravity of a space vehicle. In this one G case, a large force is applied to a common area or location 124 at the bottom of the object. A vertical axis 126 passes through the object and the location 124 is centered on the vertical axis. A large force is applied at the area 124 by a group of transducers 131–135 which are oriented so their beams 141–145 are all directed at the area 124 (there is more than 50% overlap of a plurality of beams). The transducers 131–135 are equally spaced about an imaginary circle 136 whose center lies on the axis 126. The transducer's are energized by an oscillator power source 150 whose output is delivered to all of the transducers through corresponding phase shifters 151–155. If all of the oscillators 131–135 are of precisely equal distances from the center of the area 124, then the corresponding acoustic beams 141–145 will all be in phase, and will produce a greatly increased force at the area 124, which supports the weight of the object. However, if any of the beams is considerably out of phase with the others at the area 124, then they may not be additive, and may actually cancel one another. The phase shifters 151–155 are connected to a control 160 which can adjust their phases to keep the beams in phase at the object area 124. The pressure produced by the five transducers may even be more than five times the pressure produced by a single transducer, due to the fact that the time average acoustic radiation pressure (DC pressure) on the object is proportional to the square of the total acoustic pressure applied thereto. A maximum radiation pressure of 25 times that of a single transducer could thus theoretically be achieved.

The beams 141–145 will be slightly out of phase at different parts of the curved area 124, but the effect will be minor. The amount by which the beams will be out of phase around the area 124 can be minimized by using smaller beam width or a larger sample. An additional transducer, indicated at 162, may be energized to produce a beam in phase with the others at the area 124. The horizontal position of the object in this embodiment is maintained by four transducers 170, 171, 172 (and another one which is not shown) which are driven by an oscillator 173 having a high frequency such as 70 kHz. Additional transducers can be used to enhance stability of the object as well as to control object oscillation, rotation, and shaping. Chamber walls are shown at 174 merely to contain a gas for processing and to eliminate dust and/or contain a gas under pressure.

Applicant has been able to obtain very high sound pressure levels of 140 dB at 70 kHz in a transducer having a one inch diameter face. The force on an object area produced by an acoustic beam is the average force in one direction. The 140 dB sound results in a radiation pressure on the order of 0.1 psi over the area of the one inch diameter circle on the body.

Thus, the invention provides a levitation system and method for levitating large articles, which avoids the need for highly reflective chamber walls and sound frequencies controlled by dimensions of and within the chamber. The system levitates an object using beams of sound which specifically do not produce standing wave patterns, but which produce acoustic radiation pressure on a surface of the object by the transfer of momentum from gas moved by the sound beam to an area of the object. Where force does not have to be concentrated at a single area such as the bottom of an object in a gravity environment, each beam does not overlap, or has only minimal overlap (less than 50% and preferably less than 20% of its area) with other beams, so the force produced by each beam is substantially separate from the force produced by any other beam. The wavelength of each beam must be small compared to the diameter of the sample in order to obtain a large localized radiation pressure associated with the beam. Also, the beam diameter must be large compared to the wavelength of the sound, such as at least about five times as much, in order to obtain an efficient momentum transfer to the object. The distance between the transducer face and the object surface is more than five times and preferably more than ten times the wavelength to avoid a significant standing wave pattern. In order to produce a large force at a single area of the object, a group of transducers is positioned so all of them direct their beams to overlap, and with the phases of the beams controlled so they are substantially in phase on the overlapped area of the object.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. An acoustic levitation apparatus which includes gas-containing walls largely surrounding an object levitation position where an object can lie, and an acoustic transducer apparatus for generating acoustic energy to levitate the object thereat, characterized by:

said acoustic transducer apparatus includes a plurality of transducer devices having sound emitting parts constructed to direct separate acoustic beams substantially at said levitation position, with said plurality of transducer devices being spaced about said levitation position so the acoustic beam from each of said transducer devices applies an individual force in a different direction to said object to at least control its position, and with said plurality of transducer devices being constructed so said plurality of acoustic beams are of different frequencies to avoid interference.

2. The apparatus described in claim 1 wherein: the wavelength of each of said acoustic beams is no more than one-fifth the distance between the transducer that generates the beam and said object.

3. The apparatus described in claim 1 wherein:

said walls form a chamber and including at least one gas that fills said chamber;

said at least one gas has a pressure of a plurality of times atmospheric pressure, whereby to obtain better coupling to said transducers and to the object.

4. The apparatus described in claim 1 wherein:

said object has a predetermined object diameter;

each of said plurality of transducer devices is constructed to produce a beam of sufficient narrowness and small enough spread angle, that the beam has a width at the object which is substantially no greater than one-half said object diameter.

5. The apparatus described in claim 1 including:

a gravity-opposing transducer arrangement which includes a group of transducers arranged in a circle around a vertical axis, with each transducer of said group oriented to direct an acoustic beam at an upward incline at a common location lying on said axis to help support the bottom of the object when its bottom lies at that location;

a transducer energizing source coupled to each of said transducers of said group, and constructed to energize said transducers of said group so their beams are of the same frequency and substantially in phase at said common location.

6. An acoustic levitation apparatus which includes a quantity of gas largely surrounding an object levitation position where an object can lie, and an acoustic transducer apparatus for generating acoustic energy to levitate the object thereat, characterized by:

an object lying at said object levitation position and substantially centered on an axis;

said acoustic transducer apparatus includes a plurality of current-energized transducers having spaced sound emitting parts lying substantially in a circle centered on said axis and constructed to direct separate acoustic beams at a common area on said object where said common area lies on said axis, and a power source connected to said transducers to energize them with currents of the same frequency, with the phases of currents applied to said transducers being controlled so said beams are substantially in phase at said common area.

7. An acoustic levitation system which includes a quantity of gas and an object lying in said quantity of gas at a levitation position therein, and an acoustic transducer apparatus coupled to said gas to generate acoustic energy to keep said object at said levitation position, characterized by:

said acoustic transducer apparatus includes a plurality of transducer devices having sound emitter parts coupled to said gas, with each sound emitter part constructed to direct an individual acoustic beam toward said object, with each beam having a beam width at said object that is substantially no greater than the width of said object, to minimize interference of said beams.

8. The system described in claim 7 wherein:

each of a plurality of said beams contains primarily energy of a predetermined wavelength, with said wavelength being less than 20% of the distance between the sound emitter parts of the corresponding transducers and said object.

9. The system described in claim 7 wherein:

said beams are directed at different areas of said surface of said object, and a majority of the cross-sectional areas of said beams do not significantly overlap one another on said object surface.

10. A method for acoustically levitating an object that lies at a levitation location within a gas filled chamber formed by chamber walls, comprising:

generating and directing a plurality of acoustic energy beams at said object from a plurality of locations that are spaced about said levitation location, with each of said beams being substantially nonresonant to said chamber and to the region between corresponding surfaces of said object and said locations and areas around said locations, and with said plurality of beams generated to avoid interference of said plurality of beams with each other.

11. The method described in claim 10 wherein:

said plurality of beams each have a beam width at said object which is substantially no greater than half the width of the object so most of each of said beams is intercepted by the object to avoid the interference of said plurality of beam.

12. The method described in claim 10 wherein: said plurality of beams have different frequencies.

13. The method described in claim 10 wherein:

said step of directing includes directing each beam of a second group of beams toward the same surface area of said object so they overlap at an object surface area of said object which is no more than one-third the outside area of the object, with said beams being generated so they are substantially in phase at said object surface area.

14. The method described in claim 13 wherein said chamber lies in an environment of Earth's gravity and including a vertical axis passing through said object, and wherein:

said step of generating and directing includes generating said acoustic beams of said second group from locations equally spaced around an imaginary circle that has a circle axis which is coincident with said vertical axis, and directing said beams of said second group at a lower surface area of said object which lies on and around said vertical axis;

said step of generating includes energizing each of a group of transducers that have sound emitting parts at said locations, with electrical current of the same predetermined frequency and with all of said transducers being energized substantially in phase.

15. An acoustic levitation apparatus which includes gas-containing walls largely surrounding an object levitation position where an object can lie, and an acoustic transducer apparatus for generating acoustic energy to levitate the object thereat, characterized by:

said acoustic transducer apparatus includes a plurality of transducer devices having sound emitting parts constructed to direct separate non-standing wave acoustic beams substantially at said levitation position, and with said transducer devices being spaced about said levitation position so the acoustic beam from each of said transducer devices applies an individual force in a different direction to said object to at least control its position;

said plurality of transducers includes at least eight transducers that each lies at a different one of the vertices of an imaginary geometric body that is one of the bodies of the group that consists of the following:

cube, icosahedron and dodecahedron.

16. An acoustic levitation apparatus for levitating an object at an object levitation position, which includes an acoustic transducer apparatus for generating acoustic energy to levitate the object thereat, characterized by:

said acoustic transducer apparatus includes a plurality of transducer devices having sound emitting parts constructed to direct separate acoustic beams substantially at said levitation position, and with said transducer devices being spaced about said levitation position so the acoustic beam from each of said transducer devices applies an individual force in a different direction to said object to at least control its position;

the wavelength of each of said acoustic beams is no more than one-fifth the distance between the transducer that generates the acoustic beam and said object levitation position.

17. The apparatus described in claim 16 including:

an object that lies at said object levitation position, with the wavelength of each of said acoustic beams being no more than one-tenth the distance between the transducer that generates the beam and a surface of the object at which the beam is directed.

* * * * *